United States Patent [19]

Hirabayashi et al.

[11] Patent Number: 4,840,243
[45] Date of Patent: Jun. 20, 1989

[54] FOUR-WHEEL STEERING VEHICLE

[75] Inventors: Shigefumi Hirabayashi, Hiroshima; Toshio Nakajima, Hatsukaichi; Hirotaka Kanazaira; Yasuhiro Nakashima, both of Hiroshima, all of Japan

[73] Assignee: Mazda Motor Corporation, Hiroshima, Japan

[21] Appl. No.: 238,195

[22] Filed: Aug. 30, 1988

[30] Foreign Application Priority Data

Aug. 31, 1987 [JP] Japan ................... 62-217296

[51] Int. Cl.$^4$ .................... B62D 5/04; B60T 8/00
[52] U.S. Cl. .................... 180/140; 180/142; 280/91; 303/92; 303/100
[58] Field of Search ............. 180/140, 142, 143, 244; 188/151, 346; 280/91; 303/92, 100

[56] References Cited

U.S. PATENT DOCUMENTS

| | | | |
|---|---|---|---|
| 4,499,543 | 2/1985 | Matuda | 303/92 |
| 4,572,316 | 2/1986 | Kanazawa et al. | 180/143 |
| 4,590,409 | 5/1986 | Kubota | 180/142 |
| 4,740,002 | 4/1988 | Miyashi | 280/91 |
| 4,782,907 | 11/1988 | Morishita et al. | 180/142 |

FOREIGN PATENT DOCUMENTS 60-44185  3/1985  Japan .
61-102363  5/1986  Japan .

Primary Examiner—Charles A. Marmor
Assistant Examiner—Donn McGiehan
Attorney, Agent, or Firm—Fleit, Jacobson, Cohn, Price, Holman & Stern

[57] ABSTRACT

A four-wheel steering vehicle including a four-wheel steering mechanism for controlling a steering of front and rear wheels based on a predetermined steering ratio property in accordance with an operation of a steering wheel, and an anti-lock braking system for controlling a braking force acted on each of the front and rear wheels to prevent the wheels from locking during a braking operation. The vehicle further comprises a stepping motor for controlling a steering ratio of a steering amount of the rear wheels to a steering amount of the front wheels in accordance with a vehicle speed based on said steering ratio property, fail detecting device for detecting an abnormal condition of the anti-lock braking system, compensating device for receiving signals from the fail detecting device and compensating the steering ratio property so that the rear wheels are steered in a direction and amount to improve a driving stability of the vehicle during a braking operation.

12 Claims, 9 Drawing Sheets

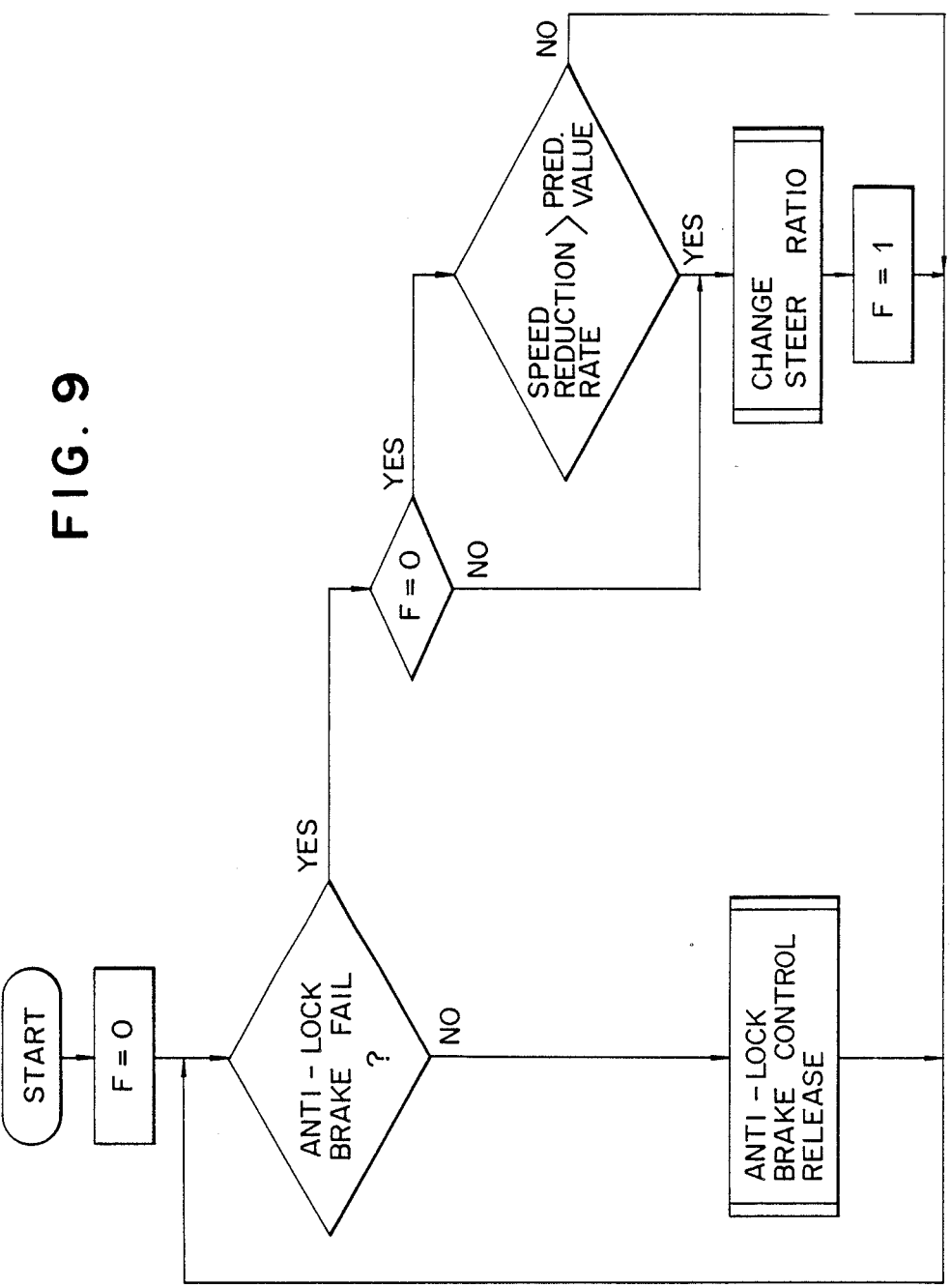

FOUR-WHEEL STEERING VEHICLE

BACKGROUND OF THE INVENTION

1. Field of the Invention

The present invention relates to a four-wheel steering vehicle in which not only front wheels but also rear wheels are steered in accordance with an operation of a steering wheel, specifically to a four-wheel steering vehicle provided with an anti-lock braking system for controlling a braking force in a manner that the front and rear wheels are kept from locking in a braking operation.

2. Description of the Prior Art

Conventionally, there has been known a four-wheel steering vehicle for a motor vehicle in which both front and rear wheels are steered in accordance with an operation of a steering wheel. Japanese Patent Publication No. 60-44185 discloses a four-wheel steering system in which a steering ratio of a steering angle of the rear wheel to that of the front wheel changes based on a steering ratio property in accordance with a vehicle speed. In the Japanese patent publication, the steering ratio property is basically set to produce a reverse phase in which the rear wheel is steered in a direction opposite to that of the front wheel in a relatively low vehicle speed and produce a same phase in which the rear wheel is steered in the same direction as the front wheel in a relatively high speed of the vehicle so that a turning performance can be improved in the relatively low speed of the vehicle and a driving stability can be maintained in the relatively high speed of the vehicle.

Meanwhile, there has been proposed a vehicle provided with an anti-lock braking system in which a braking force is controlled to prevent the wheels from locking and skidding to thereby obtain a driving stability during a braking operation. Japanese Patent Public Disclosure No. 61-102363 discloses an anti-lock braking system including a braking control device for controlling a hydraulic pressure of a wheel cylinder which applies a braking force to the wheel, a speed detecting device for detecting a wheel rotation speed, and a controller for calculating a slip ratio between the wheel and road surface based on a signal from the detecting device and providing the braking control device with a control signal in accordance with the slip ratio so as to prevent the wheel from locking.

In the anti-lock braking system as disclosed in the Japanese Patent Public Disclosure No. 61-102363, there are usually provided a fail-safe system which switches the braking control from an anti-lock braking control in which the braking force is controlled based on the slip ratio to a normal braking control in which the braking force is applied to the wheel cylinder in accordance with the braking operation for a brake pedal regardless of the slip ratio when an abnormal condition occurs in the anti-lock braking system. It should be however noted that when the anti-look oontrol is switched to the normal control, the wheel may be locked in the braking operation. This wheel locking causes an abrupt reduction of the vehicle speed and possibly a slip between the wheel and the road surface and deteriorate the driving stability. Specifically, in the four-wheel steering vehicle, the rear wheel is steered from the same phase to the reverse phase as the vehicle speed is reduced from a high speed to a low speed so that the driving stability is seriously affected.

SUMMARY OF THE INVENTION

It is therefore an object of the present invention is to provide a reliable four-wheel steering mechanism during a braking operation.

It is another object of the present invention to provide a four-wheel steering vehicle having both a four-wheel steering mechanism and an anti-lock braking system wherein a driving stability can be maintained even when the anti-lock braking system is in an abnormal condition.

It is further object of the present invention to provide a four-wheel steering vehicle in which a driving stability can be obtained even when the wheels are locked during a braking operation.

The above and other objects can be accomplished by a four-wheel steering vehicle including a four-wheel steering mechanism for controlling a steering of front and rear wheels based on a predetermined steering ratio property in accordance with an operation of a steering wheel, and an anti-lock braking system for controlling a braking force acted on each of the front and rear wheels to prevent the wheels from locking during a braking operation, the improvement comprising steering ratio changing means for controlling a steering ratio of a steering amount of the rear wheels to a steering amount of the front wheels in accordance with a vehicle speed based on said steering ratio property, fail detecting means for detecting an abnormal condition of the anti-lock braking system, compensating means for receiving signals from the fail detecting means and compensating the steering ratio property so that the rear wheels are steered in a direction and amount to improve a driving stability of the vehicle during a braking operation.

In a preferred embodiment of the present invention, the steering ratio changes from the reverse phase to the same phase as the vehicle speed is increased in a normal condition of the anti-lock braking system.

When the anti-lock braking system is in an abnormal condition, the compensating means changes the steering ratio property in which the rear wheels are steered to make the vehicle stable. In this control, preferably the rear wheels are kept from being steered in the reverse phase when the vehicle speed is abruptly decreased because of the locking of the wheels during a braking operation.

The above and other objects and features of the present invention will be apparent from the following description by taking reference with accompanying drawings employed for a preferred embodiment of the present invention.

BRIEF DESCRIPTION OF THE DRAWINGS

FIG. 9 is a flow chart showing still another control by the controller.

DETAILED DESCRIPTION OF PREFERRED EMBODIMENTS

Figure 1:
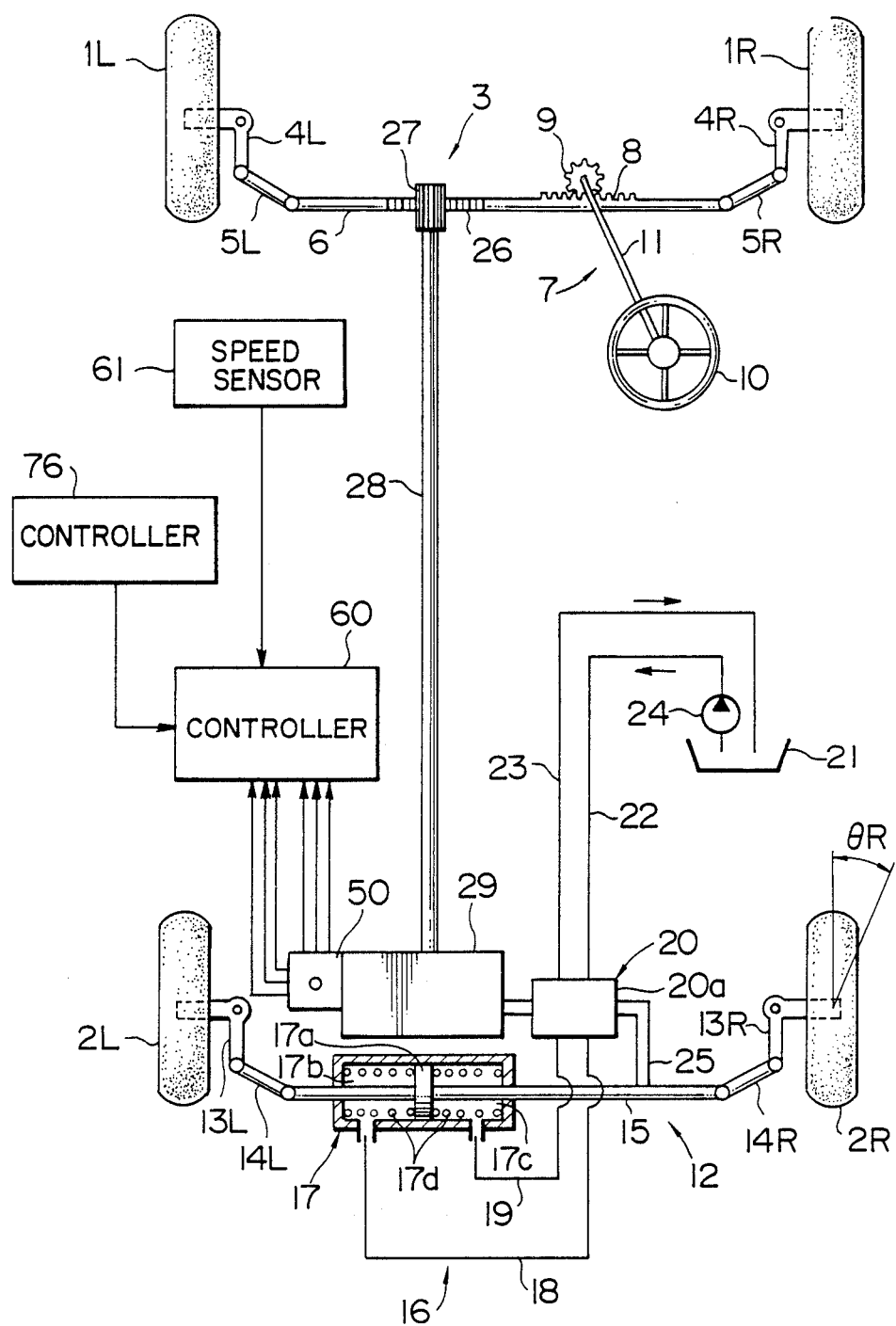
FIG. 1 is a schematic view of a four-wheel steering vehicle in accordance with the present invention.
Figure 2:
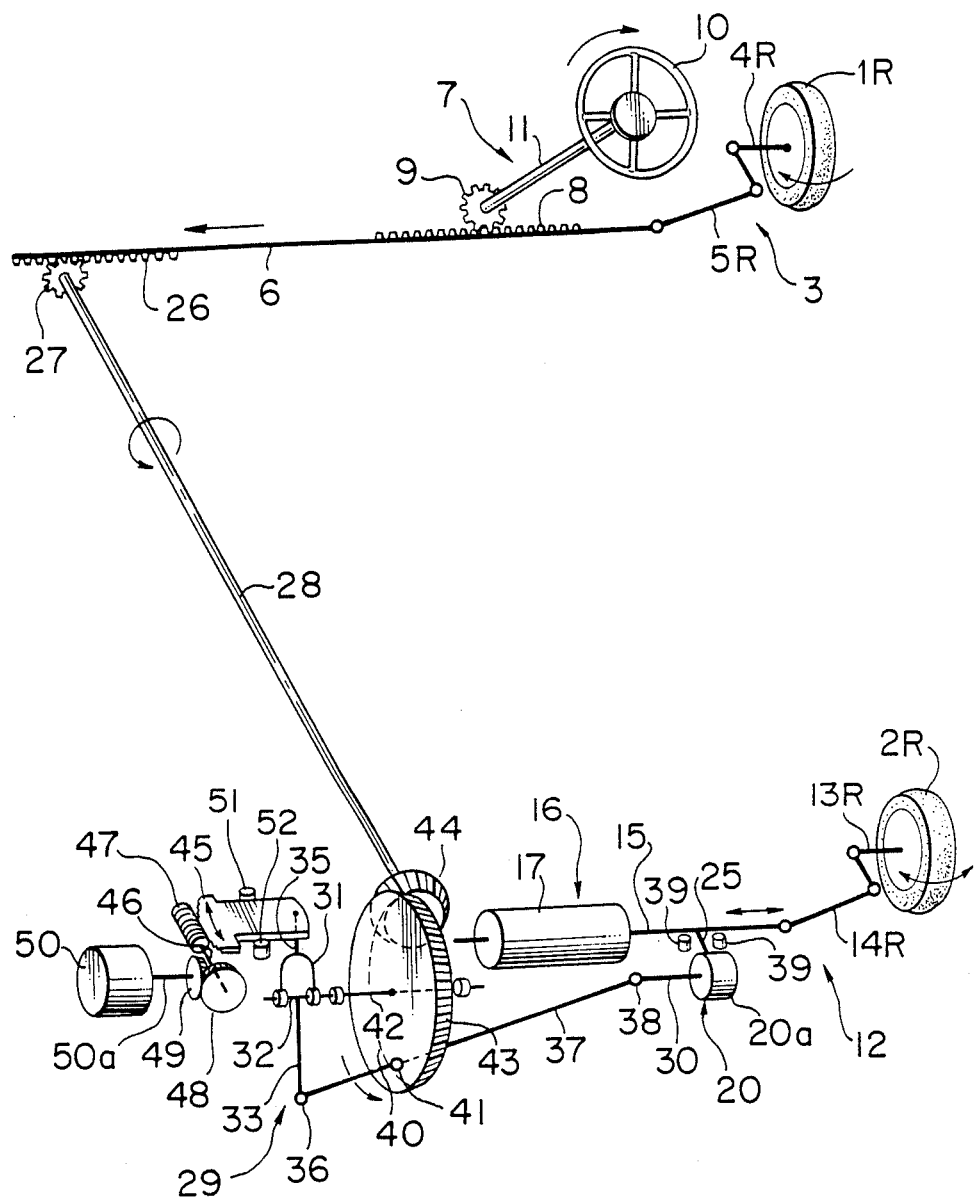
FIG. 2 is a perspective view of the four-wheel steering vehicle as shown in FIG. 1.

Referring to FIGS. 1 and 2, there is shown a four-wheel steering system having a front steering mechanism 3 connected with a right and left front wheels 1R, 1L, and a rear steering mechanism 12 connected with a right and left rear wheels 2R, 2L.

The front steering mechanism 3 is provided with a pair of right and left knuckle arms 4R, 4L, tie rods 5R, 5L and relay rod 6 which connects the tie rods 5R, 5L with each other. The front steering mechanism 3 is connected with a steering wheel 10 through a steering device 7 of a rack and pinion type. The steering device 7 is provided with a rack 8 formed on the relay rod 6, a steering shaft 11 provided at the lower end with a pinion 9 which is brought into meshing engagement with the rack 8 to steer the front wheel 1R, 1L in accordance with an operation of the steering wheel 10.

The rear wheel steering mechanism 12 is provided with a pair of knuckle arms 13R, 13L, tie rods 14R, 14L, a relay rod 15 connecting the tie rods 14R, 14L with each other and a hydraulic power steering mechanism 16. The power steering mechanism 16 is provided with a power cylinder 17 fixed to a vehicle body. The relay rod 15 is disposed in the power cylinder 17 as a piston rod. An inner space of the power cylinder is divided by a piston 17a integrally formed on the relay rod 15 to define oil chambers 17b and 17c which are respectively connected with a control valve 20 through oil passages 18 and 19. The control valve is connected with a reservoir tank 21 through a supply passage 22 and return passage 23. On the supply passage 22, there is disposed a hydraulic pump 24 driven by an engine power.

The control valve 24 is constituted by a well-known spool valve type and is provided with a tubular valve casing 20a integrally mounted on the relay rod 15 through a link member 25 and a spool (not shown) disposed in the valve casing 20a so that the control valve 24 supplies one of the oil chambers 17b and 17c with a hydraulic pressure from the hydraulic pump 24 in accordance with a movement of the spool to assist an operation of the relay rod 15. There is disposed return springs 17d, 17d in the oil chambers 17b, 17c respectively for resiliently positioning the relay rod 15 at a neutral position in which steering angles $\theta_R$ of the rear wheels 2R, 2L are zero.

On the relay rod 6 of the front wheel steering mechanism 3, a rack 26 is formed apart from the rack 8. The rack 26 is meshed with a pinion 27 mounted on a front end of the rotation shaft 28 extending in the longitudinal direction of the vehicle body with a rear end of the rotation shaft 28 being connected with the rear wheel steering mechanism 12 through a steering ratio control mechanism 29.

As shown in FIG. 2, the steering ratio control mechanism 29 is provided with a control rod 30 which is transversely slidably carried by the vehicle body. One end of the control rod 30 is connected with the spool of the control valve 20. The steering ratio control mechanism 29 is further provided with a swing arm 33 swingably carried by a U-shaped holder 31 at the base end portion thereof through a support pin 32. The U-shaped holder 31 is rotatably carried by a casing (not shown) fixed to the vehicle body through a support shaft 35 of which rotation axis crosses a moving axis of the control rod 30 at right angles. The support pin 32 is located at the crossing point of the rotation axis of the support shaft 35 and the moving axis of the control rod 30 extends in a direction perpendicular to the rotation axis of the support shaft 35. As the holder 31 rotates around the support axis 35, an angle between the support pin 32 and the moving axis of the control rod 30, that is, an angle between a locus surface on which the swing arm 33 is swung around the support pin 32 and a surface perpendicular to the moving axis of the control rod 30 (hereinafter referred as a base surface) is changed.

The tip end of the swing arm 33 is connected with one end of a connecting rod 37 through a ball joint 36. The other end of the connecting rod 37 is connected with the other end of the control rod 30 to displace the control rod 30 transversely as the tip end of the swing arm 33 moves transversely.

The connecting rod 37 is swingably carried by a member 40 through a ball joint 41 in the vicinity of the ball joint 36. The member 40 is integrally formed with a bevel gear 43 which is rotatably mounted on a rotation shaft disposed on the moving axis of the control rod 30. The bevel gear 43 is brought into a meshing engagement with a bevel gear 44 mounted on a rear end of the rotation shaft 28 so that a rotative movement of the steering wheel 10 is transmitted to the member 40. As a result, the member 40 and connecting rod 37 are rotatably moved by the same amount as that of the rotative movement of the steering wheel 10 so that the swing arm 33 is swung around the support pin 32. In the case where the axis of the support pin 32 accords with the moving axis of the control rod 30, the ball joint 36 at the tip end of the swing arm 33 is swung in the base surface so that the control rod 30 does not move. On the other hand, in the case where the axis of the support pin 32 is offset from the moving axis, in other words, in the case where the surface of the locus of the swing arm 33 is offset from the base surface, when the swing arm 33 is swung around the support pin 32 the ball joint 36 is displaced transversely. This displacement of the ball joint 36 is in turn transmitted to the control rod 30 through the connecting rod 37 so that the control rod 30 moves along the moving axis thereof to thereby move the spool of the control valve 20. This means that even where an angular amount of the swinging movement of the swing arm 33 is constant, the amount of the transverse movement of the control rod 30 changes as the angle of the support pin 32 or the angular amount of the rotative movement of the holder 31 changes.

In order to change the angle of the support pin 32 against the moving axis of the control rod 30, namely the angle of the holder 31 against the base surface, a sector gear 45 is mounted on the support shaft 35 of the holder 31 as a worm wheel with the sector gear 45 being brought into a meshing engagement with a worm gear 47 formed on a rotation shaft 46. On the rotation shaft 46, there is mounted a bevel gear 48 in meshing engagement with a bevel gear 49 mounted on an output shaft 50a of a stepping motor 50.

As the stepping motor 50 is actuated to rotate the sector gear 45, the angle between the holder 31 and the base surface changes so that steering angles $\theta_R$ of rear wheels 2R, 2L can be controlled. When the sector gear 45 is rotated in the clockwise direction with regard to a plan view thereof from a neutral position in which a center line of the sector gear 45 crosses a rotation axis of the rotation shaft 46 of the worm gear 47 at right angles, the rear wheels 2R, 2L are steered in the opposite direction to that of the front wheels 1R, 1L (reverse phase). When the sector gear 45 is rotated in the counterclockwise, the rear wheels 2R, 2L are steered in the same direction as the front wheels 1R, 1L ( same phase). On the casing for carrying the holder 31, there are mounted a pair of pin stoppers 51, 52 at the opposite sides of the sector gear 45 for restricting the movement of the sector gear 45. Therefore, the sector gear 45 rotates by a predetermined angle, such as −17.5° in the reverse phase direction to be brought into contact with the stopper 51 to be stopped. The sector gear 45 rotates by a predetermined angle such as 20° in the same phase direction to be brought into contact with the stopper 52 to be stopped. The stepping motor 50 is initialized at the position where the sector gear 45 is in touch with the stopper 51 in the reverse phase direction.

There is provided a rod stopper 39 for defining the maximum movement of the relay rod 15 of the rear wheel steering mechanism.

Figure 3:
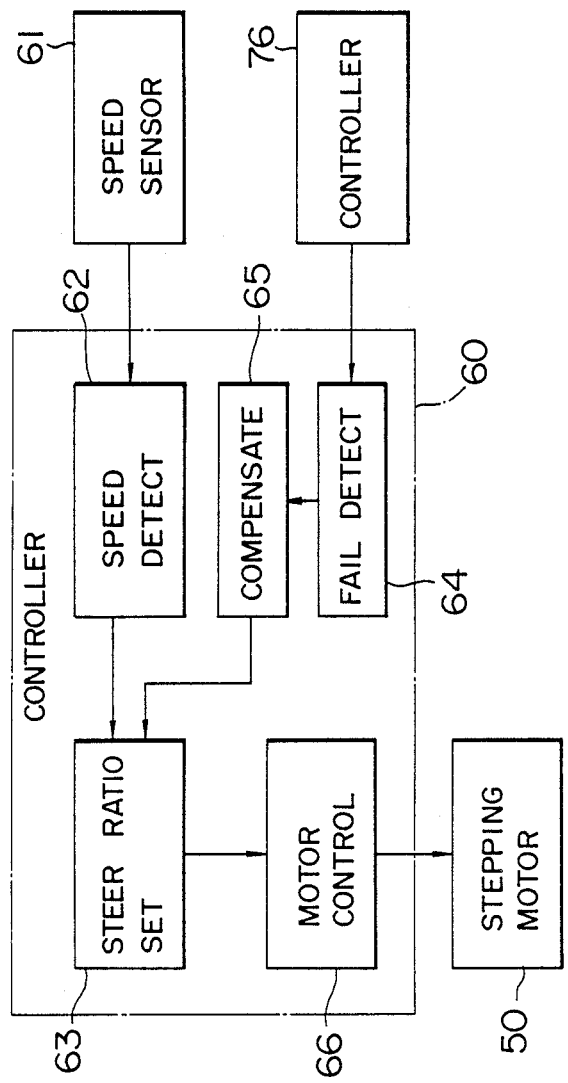
FIG. 3 is a block diagram of a controller for the four-wheel steering mechanism.

As shown in FIG. 3, the stepping motor 50 is controlled by a signal from a controller 60 including a micro computer and is adapted to operate as a steering ratio changing device.

The controller 60 includes a vehicle speed detecting device 62 for detecting a vehicle speed based on a signal from a vehicle speed sensor 61, a steering ratio setting device 63 for setting a steering ratio of a steering angular amount of the rear wheels 2R, 2L to that of the front wheels 1R, 1L based on a predetermined steering ratio property in accordance with the vehicle speed detected by the vehicle speed detecting device 62, a fail detecting device 64 for detecting an abnormal condition of an anti-lock braking system based on a signal from a controller 76 which is provided for the anti-lock braking system, a compensating device 65 for producing a compensating signal to the steering ratio setting means based on the signal from the fail detecting device 64 in a manner that the steering ratio property is shifted in the same phase direction to improve a driving stability of the vehicle during a braking operation when the anti-lock braking system is in an abnormal condition, and a motor control device 66 for controlling the stepping motor 50 in accordance with the signal from the steering ratio setting device 63.

Figure 4:
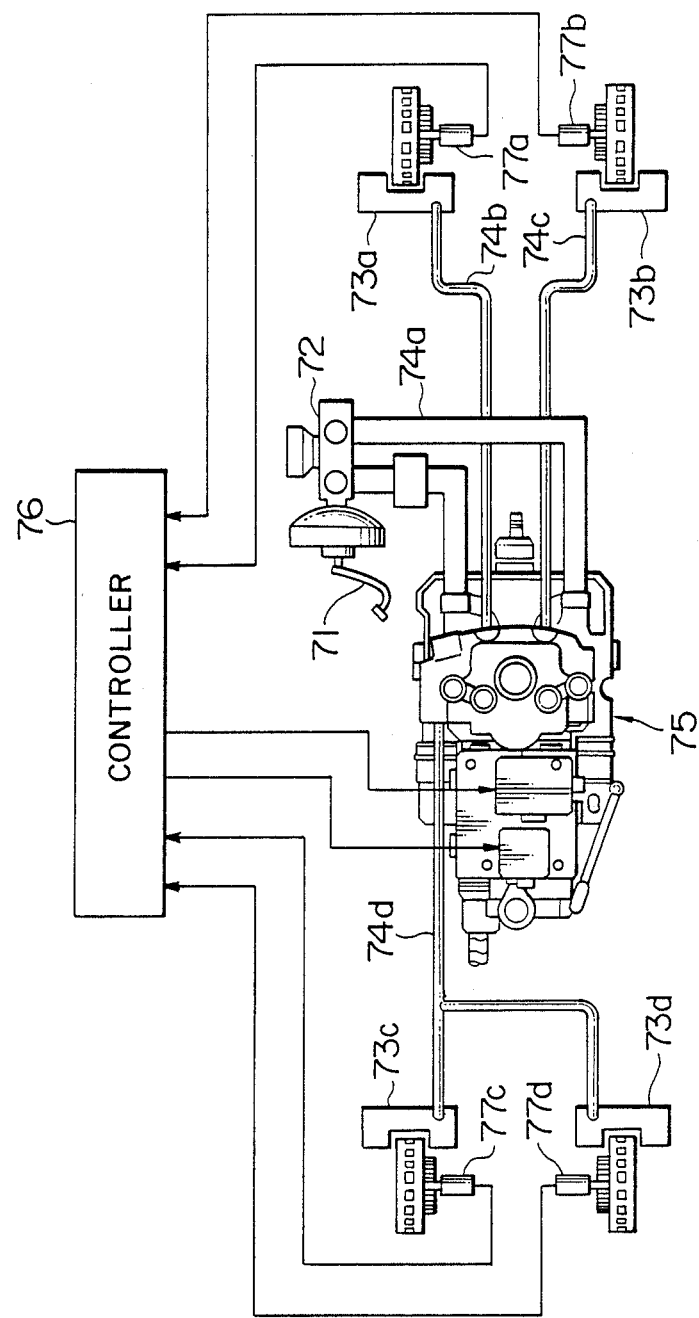
FIG. 4 is a schematic view of an anti-lock braking system.

Now referring to FIG. 4, there is shown the anti-lock braking system. The braking system includes a brake pedal 71, a master cylinder 72 for converting a force applied to the brake pedal 71 to a hydraulic pressure, and wheel cylinders 73a, 73b, 73c and 73d for providing the front and rear wheels 1R, 1L, 2R and 2L with braking forces respectively. The master cylinder 72 is connected with the wheels cylinders 73a, 73b, 73c and 73d through hydraulic passages 74a, 74b, 74c and 74d. A hydraulic unit 75 is connected with the hydraulic passages 74a, 74b, 74c and 74d for controlling the braking forces applied to the wheel cylinders 73a, 73b, 73c and 73d.

The hydraulic unit 75 includes magnetic valves, electric motors and the like which are controlled by a controller 76. There are provided wheel speed detecting devices 77a, 77b, 77c and 77d for detecting rotation speeds of the front and rear wheels 1R, 1L, 2R and 2L respectively. Signals from the wheel speed detecting devices 77a, 77b, 77c and 77d are introduced into the controller 76.

Figure 5:
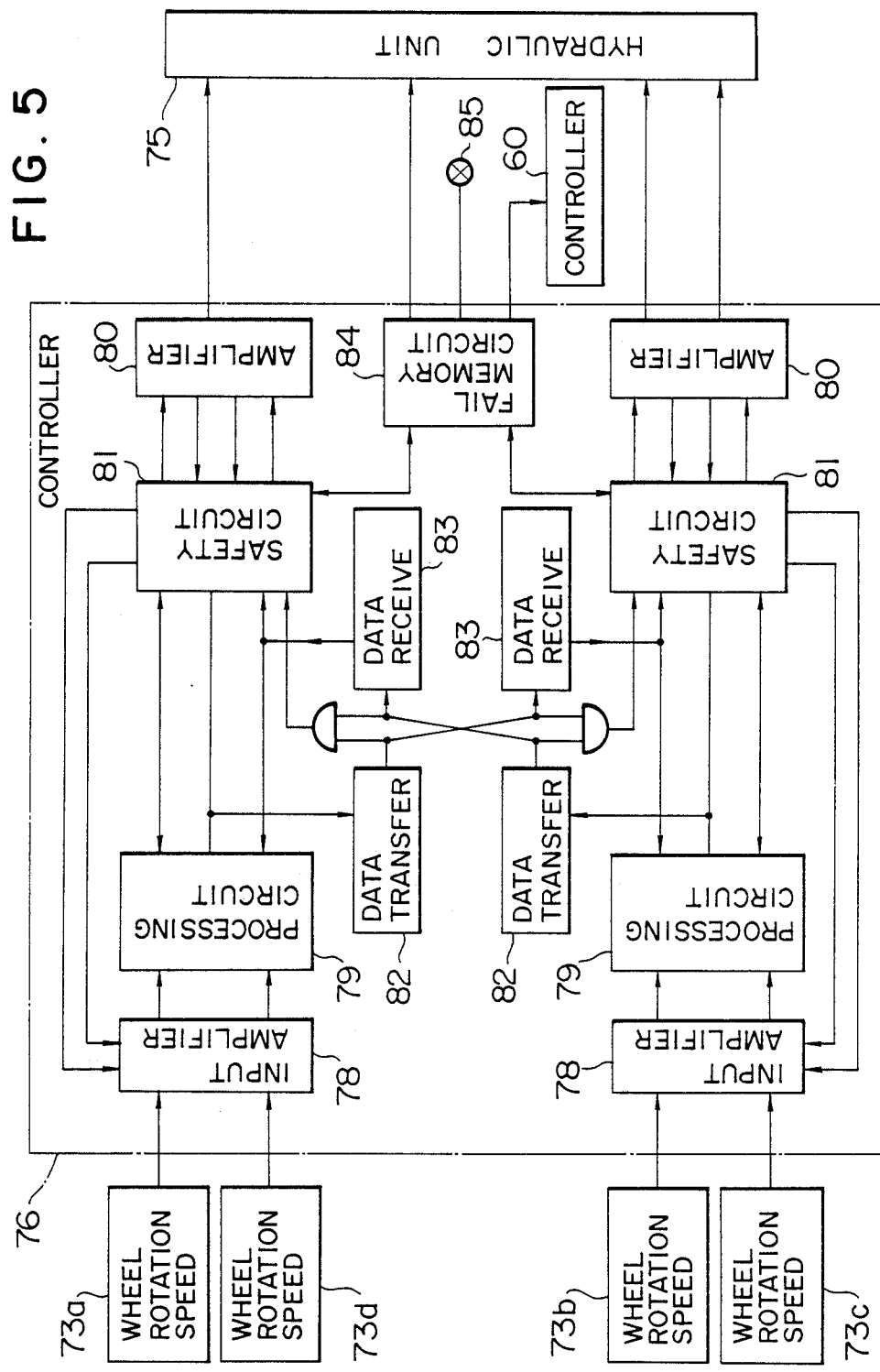
FIG. 5 is a block diagram of a controller for the braking system.

As shown in FIG. 5, the controller 76 includes an input amplifier 78 for converting signals from the wheel speed detecting devices 77a, 77b, 77c and 77d to rectangular wave signals and amplifying the converted signals, a processing circuit 79 for calculating a slip rate of the wheels 1R, 1L, 2R and 2L based on the signals from the amplifier 78 and producing a control signal for preventing the wheels 1R, 1L, 2R and 2L from locking and a current amplifier 80 for supplying the hydraulic unit 75 with a control current based on the processing circuit 79. The controller 76 is provided with a pair of units comprising the above devices 78 -80 which operate independently and check the operations with each other.

The signal from one of the processing circuits 79 is introduced a safety circuit 81 of one of the units and to a safety circuit 81 of the other of the units through a data transfer circuit 82 and a data receiving circuit 83. Each of the safety circuits 81 compares with the signals from the processing circuits 79 of one and the other of the units to judge whether or not the an abnormal condition occurs.

When an abnormal condition is detected, the signals from the processing circuit 79 are introduced from the safety circuit 81 to a fail memory circuit 84 in which the fail condition is memorized so that the controller 76 is actuated to turn a warning lamp on and control a current for the hydraulic unit 75 to provide the wheels with equal braking forces in accordance a brake pedal operation. The fail memory circuit 84 produces a signal to the fail detecting device 64 of the controller 60 which controls the stepping motor 50 for the four-wheel steering mechanism so that the fail detecting device 64 can detect the abnormal condition of the anti-lock braking system.

In operation of the four-wheel steering mechanism and the controller 60, when the anti-lock braking system is in a normal condition, the controller 60 causes the steering ratio setting device 63 to set a steering ratio of the steering amount of the rear wheels 2R, 2L to that of the front wheels 1R, 1L based on the predetermined steering ratio property in accordance with the vehicle speed. Signal denoting a steering ratio set by the steering ratio setting device 63 is introduced into the motor control device 66 so that the stepping motor is operated based on the predetermined steering ratio property, in other words, a basic steering ratio property.

Figure 6:
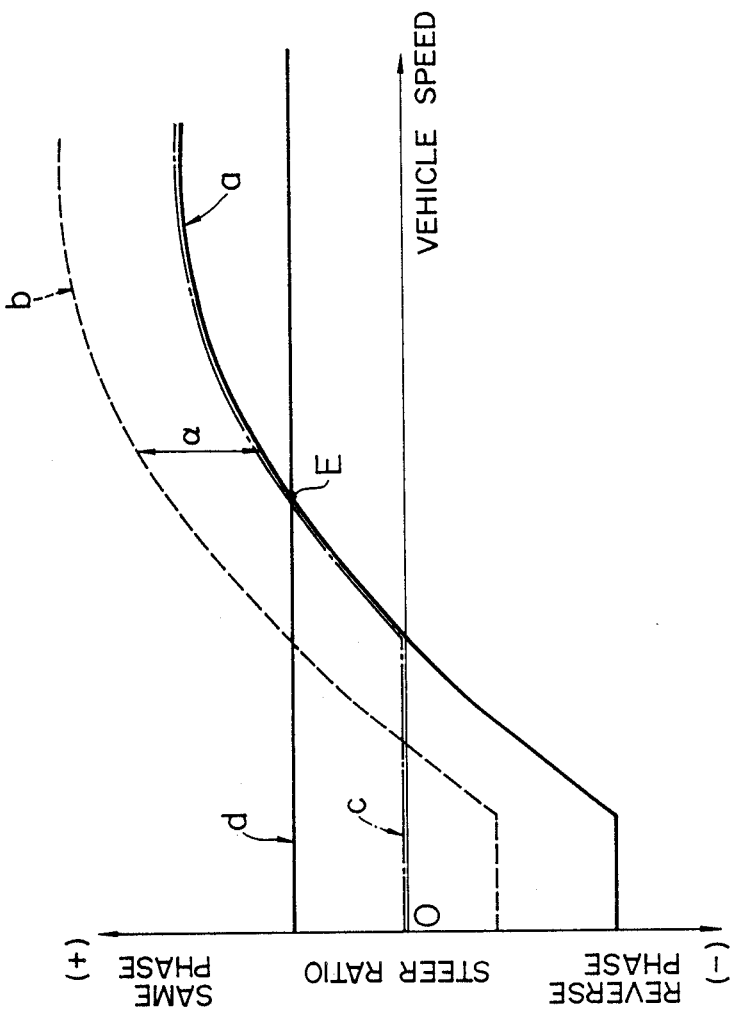
FIG. 6 is a graphical presentation of a steering ratio property.

In FIG. 6, there is shown an illustrative basic steering ratio property by a real line a. According to this property, the steering ratio between the rear and front wheels changes in accordance with the vehicle speed. In a relatively low vehicle speed condition, the steering ratio takes a negative value. This means that the rear wheels 2R, 2L are steered in a direction opposite to that of the front wheels 1R, 1L or in the reverse phase direction so as to improve a turning performance in a turning operation of the vehicle. In a relatively high speed condition of the vehicle, the steering ratio takes a positive value so that the rear wheels are steered in the same direction as the front wheels or in the same phase direction so as to improve a driving stability in the turning operation of the vehicle.

When the anti-lock braking system is in an abnormal or fail condition, the controller 60 detects the fail condition through the fail detecting device 64. The compensating device 65 supplies the steering ratio setting device 63 with a compensating signal so that the steering ratio property is shifted as shown by a broken line b in the steering ratio setting device 63 wherein the basic steering ratio property is shifted by a predetermined amount of α in the same phase side. The stepping motor 50 is controlled based on the compensated steering ratio property b. As a result, in the case where the anti-lock braking system is in an abnormal condition, when the wheels are locked during a braking operation to reduce the vehicle speed abruptly, the rear wheels 2R, 2L are suppressed to be steered substantially in the reverse phase so that the driving stability can be maintained.

Alternatively, in the fail condition of the anti-lock braking system, the basic steering ratio property a can be compensated in a manner that the reverse phase of the steering ratio is eliminated in a low vehicle speed condition of the vehicle as shown by a chain line c in FIG. 6.

Further, when the anti-lock braking system is in the fail condition, the steering angle $\theta_R$ of the rear wheels 2R, 2L can be maintained at zero irrespective of the vehicle speed so that the vehicle is driven in a two-wheel steering condition.

Figure 7:
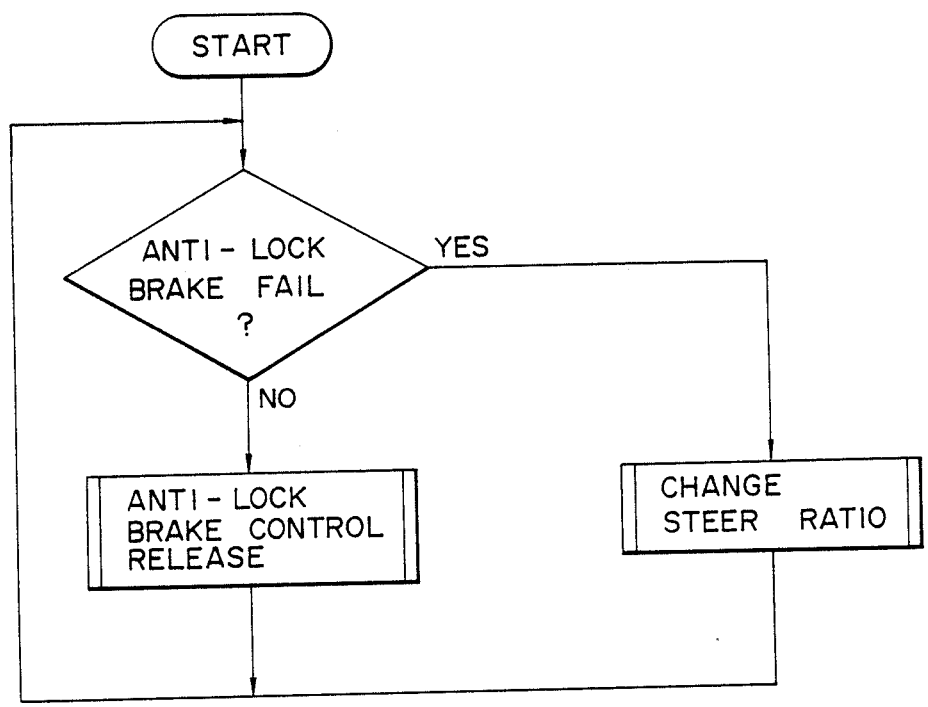
FIG. 7 is a flow chart showing a control by the controller.

The steering ratio can be controlled in a manner that whenever an abnormal condition is detected the basic steering ratio property a is shifted to the compensated steering ratio property b irrespective of the vehicle speed as shown in FIG. 7.

Figure 8:
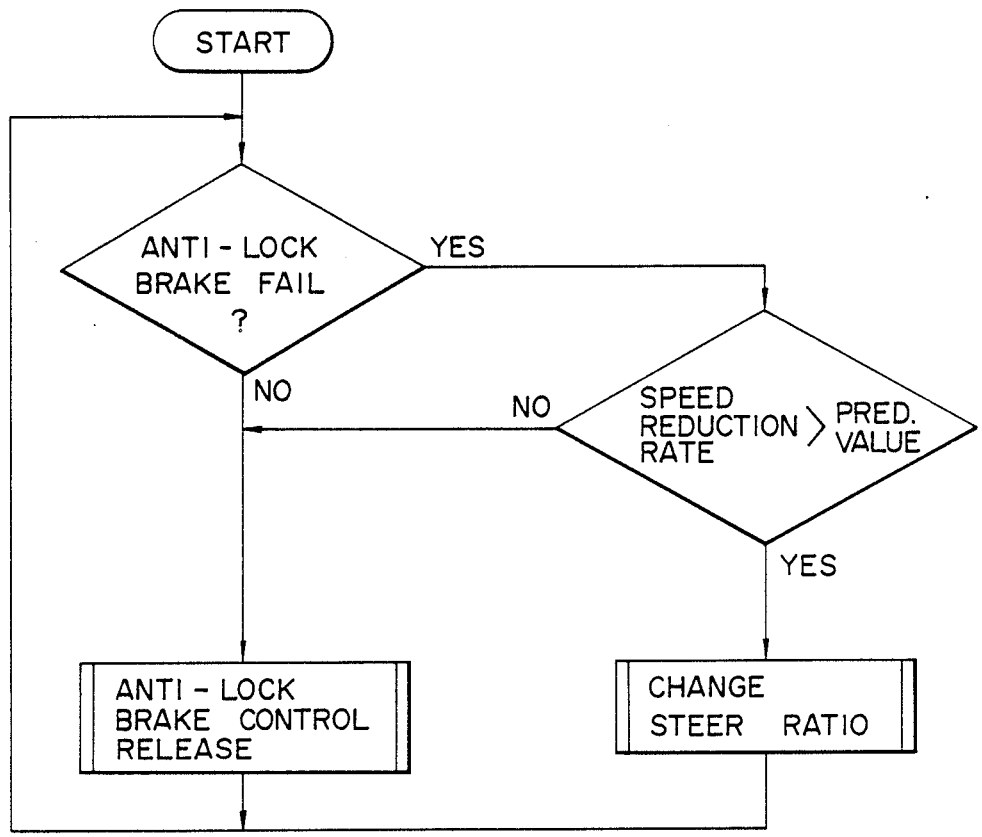
FIG. 8 is a flow chart showing another control by the controller.

In another embodiment of the present invention, the controller 60 judges through the fail detecting device 64 whether or not the anti-lock braking system is in a normal condition. As shown in FIG. 8, the controller 60 in turn judges whether or not a reducing rate in the vehicle speed is bigger than a predetermined value when the anti-lock braking system is in an abnormal condition. This judgment can be made by judging whether the brake pedal 71 is operated more than a predetermined stroke. When this judgment is yes, the controller 60 shifts the basic steering ratio property a to the compensated steering ratio property b.

There is shown in FIG. 9 a flow chart in accordance with a still further embodiment of the present invention. According to this embodiment, the controller 60 sets a flag F=0 as an initial value and judges whether or not the anti-lock braking system is in an abnormal condition. Then the controller 60 judges whether a reducing rate in the vehicle speed is bigger than a predetermined value when the flag is the initial value F=0. If the judgment is yes, the controller 60 shifts the steering ratio property a to the property b in FIG. 6 and sets the flag F=1. Once the flag is set F=1, the shift of the steering ratio property can be made even when the brake pedal 71 is not operated so hard.

In the control of the steering ratio in the abnormal condition of the anti-lock braking system, the steering ratio can be fixed to a value as shown by line d in FIG. 6 just before the abnormal condition is detected and the vehicle speed reduces abruptly wherein the abnormal condition occurs when the steering ratio is provided by a point E on the line a.

Further, when an abnormal condition occurs, the steering ratio can be controlled by changing a driving speed of the stepping motor 50 wherein the stepping motor is driven at a relatively slow speed in the abnormal condition of the anti-lock braking system in comparison with the normal condition.

It will be apparent that many modifications and variations may be made based on the above descriptions by those skilled in the art without apart from the scope of the claims as attached.

We claim:
1. A four-wheel steering vehicle including a four-wheel steering mechanism for controlling a steering of front and rear wheels based on a predetermined steering ratio property in accordance with an operation of a steering wheel, and an anti-lock braking system for controlling a braking force acted on each of the front and rear wheels to prevent the wheels from locking during a braking operation, the improvement comprising steering ratio changing means for controlling a steering ratio of a steering amount of the rear wheels to a steering amount of the front wheels in accordance with a vehicle speed based on said steering ratio property, fail detecting means for detecting an abnormal condition of the anti-lock braking system, compensating means for receiving signals from the fail detecting means and compensating the steering ratio property so that the rear wheels are steered in a direction and amount to improve a driving stability of the vehicle during a braking operation.

2. A four-wheel steering vehicle in accordance with claim 1 wherein the anti-lock braking system stops controlling the braking force during the braking operation in an abnormal condition of the anti-lock braking system so that each of the wheels are braked in accordance with a stroke of a brake pedal.

3. A four-wheel steering vehicle in accordance with claim 2 wherein both the four-wheel steering mechanism and the anti-lock braking system are controlled based on the signals from the fail detecting means.

4. A four-wheel steering vehicle in accordance with claim 1 wherein the improvement further comprises a speed reduction rate detecting means for detecting a reduction rate of the vehicle speed, the compensating means being actuated when the fail detecting means detects an abnormal condition of the anti-lock braking system and the speed reduction rate detecting means detects a vehicle speed reduction rate more than a predetermined value.

5. A four-wheel steering mechanism in accordance with claim 4 wherein the speed reduction rate detecting means is a brake switch which is actuated when a brake pedal is operated.

6. A four-wheel steering mechanism in accordance with claim 4 wherein the compensating means is maintained at an operating condition once a vehicle speed reduction rate more than the predetermined value is detected.

7. A four-wheel steering vehicle in accordance with claim 1 wherein. the steering ratio property is set to provide a steering ratio of a reverse phase in which the rear wheels are steered in a direction opposite to that of the front wheels steered when the vehicle is in a relatively low speed and to provide a steering ratio of a same phase in which the rear wheels are steered in the same direction as the front wheels steered when the vehicle is in a relatively high speed.

8. A four-wheel steering vehicle in accordance with claim 7 wherein the steering ratio property is changed by motor means.

9. A four-wheel steering vehicle in accordance with claim 8 wherein the compensating means provides the motor means with a relatively low speed in an abnormal condition of the anti-lock braking system in comparison with a normal condition of the anti-lock braking system.

10. A four-wheel steering vehicle in accordance with claim 7 wherein the compensating means maintains the rear wheels at neutral positions in an abnormal condition of the anti-lock braking system.

11. A four-wheel steering vehicle in accordance with claim 7 in which the compensating means maintains the steering ratio at a value just before an abnormal condition of the anti-lock braking system is detected.

12. A four-wheel steering vehicle in accordance with claim 7 in which the compensating means shifts the steering ratio property in a direction of the same phase in an abnormal condition of the anti-lock braking system.

* * * * *